United States Patent
Pao et al.

(10) Patent No.: US 10,809,497 B2
(45) Date of Patent: Oct. 20, 2020

(54) OPTICAL LENS AND ELECTRONIC DEVICE USING THE SAME

(71) Applicant: ABILITY ENTERPRISE CO., LTD, New Taipei (TW)

(72) Inventors: Chao-Han Pao, New Taipei (TW); Shuo-Hsien Cheng, New Taipei (TW)

(73) Assignee: ABILITY ENTERPRISE CO., LTD, New Taipei (TW)

( * ) Notice: Subject to any disclaimer, the term of this patent is extended or adjusted under 35 U.S.C. 154(b) by 30 days.

(21) Appl. No.: 16/015,206

(22) Filed: Jun. 22, 2018

(65) Prior Publication Data

US 2018/0372998 A1 Dec. 27, 2018

(30) Foreign Application Priority Data

Jun. 23, 2017 (TW) .............................. 106121110 A

(51) Int. Cl.
*G02B 3/02* (2006.01)
*G02B 13/00* (2006.01)
*G02B 9/64* (2006.01)
*G02B 1/04* (2006.01)

(52) U.S. Cl.
CPC .......... *G02B 13/0045* (2013.01); *G02B 9/64* (2013.01); *G02B 13/006* (2013.01); *G02B 1/041* (2013.01)

(58) Field of Classification Search
CPC ................................................ G02B 13/0045
USPC ....................................................... 359/708
See application file for complete search history.

(56) References Cited

U.S. PATENT DOCUMENTS

| 9,477,064 B1 | 10/2016 | Chen et al. | |
|---|---|---|---|
| 2014/0071331 A1* | 3/2014 | Katou | G02B 13/18 348/345 |
| 2016/0077314 A1* | 3/2016 | Nishimura | G02B 13/06 359/708 |
| 2016/0170175 A1* | 6/2016 | Chang | G02B 13/0045 359/708 |

FOREIGN PATENT DOCUMENTS

| CN | 102362208 A | 2/2012 |
|---|---|---|
| CN | 104793317 A | 7/2015 |
| CN | 104834076 A | 8/2015 |
| CN | 107065137 A | 8/2017 |
| CN | 110023809 A | 7/2019 |
| JP | 2002116491 A | 4/2002 |
| TW | 200909862 A | 3/2009 |

* cited by examiner

*Primary Examiner* — James C. Jones
(74) *Attorney, Agent, or Firm* — CKC & Partners Co., LLC

(57) ABSTRACT

An electronic device has an optical lens. The optical lens includes in order from an object side to an image-forming side, a first lens, a second lens, a third lens, a fourth lens, a fifth lens, a sixth lens, a seventh lens, and an eighth lens. The second lens and the third lens have negative powers respectively, and the fourth lens, the sixth lens, and the eighth lens have positive powers respectively. The first lens is a plastic lens. The object-side surface of the first lens is a convex, surface and/or the image-side surface of the first lens is a concave surface. The sixth lens and the seventh lens are made into a doublet lens.

20 Claims, 7 Drawing Sheets

| lens | surface | curvature radius (mm) | thickness (mm) | refractive index | material | Abbe number |
|---|---|---|---|---|---|---|
| L1 | S1 | 11.72 | 1.50 | 1.6 | plastic | 30 |
|  | S2 | 8.1 | 0.50 |  |  |  |
| L2 | S3 | 9.14 | 0.60 | 1.8 | glass | 45 |
|  | S4 | 3.35 | 1.97 |  |  |  |
| L3 | S5 | 31.62 | 0.46 | 1.7 | glass | 53 |
|  | S6 | 1.86 | 1.02 |  |  |  |
| L4 | S7 | 8.01 | 1.19 | 1.8 | glass | 23 |
|  | S8 | -15.30 | 0.8 |  |  |  |
| St | St | ∞ | 0.30 |  |  |  |
| L5 | S9 | -5.22 | 1.35 | 1.9 | glass | 35 |
|  | S10 | -3.2 | 0.10 |  |  |  |
| L6 | S11 | 4.10 | 1.77 | 1.5 | glass | 80 |
|  | S12 | -3.72 | 0 |  |  |  |
| L7 | S13 | -3.72 | 0.40 | 1.9 | glass | 20 |
|  | S14 | 19.68 | 0.10 |  |  |  |
| L8 | S15 | 4.97 | 1.76 | 1.6 | glass | 60 |
|  | S16 | -3.63 | 1.49 |  |  |  |
| F | S17 | ∞ | 0.30 |  | glass | 60 |
|  | S18 | ∞ | 0.45 |  |  |  |
| C | S19 | ∞ | 0.50 |  | glass | 60 |
|  | S20 | ∞ | 0.40 |  |  |  |
|  | I | ∞ | 0 |  |  |  |

Fig. 2A

|  | K | A4 | A6 | A8 | A10 | A12 |
|---|---|---|---|---|---|---|
| S2 | -3.1E-01 | 1.2E-04 | 8.5E-07 | 9.7E-08 | -1.9E-09 | 0E+00 |
| S15 | -1.3E+01 | 5.5E-03 | -3.7E-04 | 6.6E-06 | 1.3E-05 | 3.0E-07 |
| S16 | -9.7E+00 | -1.8E-02 | 5.6E-03 | -9.1E-04 | 7.8E-05 | 2.8E-07 |

Fig. 2B

| lens | surface | curvature radius (mm) | thickness (mm) | refractive index | material | Abbe number |
|---|---|---|---|---|---|---|
| L1' | S1' | 393.63 | 1.50 | 1.6 | plastic | 30 |
|  | S2' | 22.76 | 0.50 |  |  |  |
| L2 | S3 | 9.14 | 0.60 | 1.8 | glass | 45 |
|  | S4 | 3.35 | 1.97 |  |  |  |
| L3 | S5 | 31.62 | 0.46 | 1.7 | glass | 53 |
|  | S6 | 1.86 | 1.02 |  |  |  |
| L4 | S7 | 8.01 | 1.19 | 1.8 | glass | 23 |
|  | S8 | -15.30 | 0.8 |  |  |  |
| St | St | ∞ | 0.30 |  |  |  |
| L5 | S9 | -5.22 | 1.35 | 1.9 | glass | 35 |
|  | S10 | -3.2 | 0.10 |  |  |  |
| L6 | S11 | 4.10 | 1.77 | 1.5 | glass | 80 |
|  | S12 | -3.72 | 0 |  |  |  |
| L7 | S13 | -3.72 | 0.40 | 1.9 | glass | 20 |
|  | S14 | 19.68 | 0.10 |  |  |  |
| L8 | S15 | 4.97 | 1.76 | 1.6 | glass | 60 |
|  | S16 | -3.63 | 1.49 |  |  |  |
| F | S17 | ∞ | 0.30 |  | glass | 60 |
|  | S18 | ∞ | 0.45 |  |  |  |
| C | S19 | ∞ | 0.50 |  | glass | 60 |
|  | S20 | ∞ | 0.40 |  |  |  |
|  | I | ∞ | 0 |  |  |  |

Fig. 4A

|  | K | A4 | A6 | A8 | A10 | A12 |
|---|---|---|---|---|---|---|
| S2' | -2.8E-01 | -1.7E-05 | -1.1E-08 | 8.6E-11 | 3.6E-13 | 0E+00 |
| S15 | -1.3E+01 | 5.5E-03 | -3.7E-04 | 6.6E-06 | 1.3E-05 | 3.0E-07 |
| S16 | -9.7E+00 | -1.8E-02 | 5.6E-03 | -9.1E-04 | 7.8E-05 | 2.8E-07 |

Fig. 4B

| lens | surface | curvature radius (mm) | thickness (mm) | refractive index | material | Abbe number |
|---|---|---|---|---|---|---|
| L1 | S1 | 12.50 | 1.50 | 1.6 | plastic | 55 |
| | S2 | 7.05 | 1.00 | | | |
| L2 | S3 | 9.03 | 0.60 | 1.8 | glass | 45 |
| | S4 | 3.61 | 1.98 | | | |
| L3 | S5 | 57.04 | 0.45 | 1.7 | glass | 53 |
| | S6 | 2.11 | 2.47 | | | |
| L4 | S7 | 6.40 | 1.39 | 1.8 | glass | 23 |
| | S8 | -79.80 | 0.72 | | | |
| St | St | ∞ | 0.20 | | | |
| L5 | S9 | -7.05 | 0.88 | 1.9 | glass | 35 |
| | S10 | -4.09 | 0.10 | | | |
| L6 | S11 | 3.47 | 1.43 | 1.5 | glass | 80 |
| | S12 | -4.64 | 0 | | | |
| L7 | S13 | -4.64 | 0.40 | 1.9 | glass | 20 |
| | S14 | 6.82 | 0.57 | | | |
| L8 | S15 | 3.03 | 1.83 | 1.6 | glass | 60 |
| | S16 | -4.68 | 1.48 | | | |
| F | S17 | ∞ | 0.30 | | glass | 60 |
| | S18 | ∞ | 0.45 | | | |
| C | S19 | ∞ | 0.50 | | glass | 60 |
| | S20 | ∞ | 0.40 | | | |
| | I | ∞ | 0 | | | |

Fig. 6A

| | K | A4 | A6 | A8 | A10 | A12 |
|---|---|---|---|---|---|---|
| S15 | -6.8E-01 | -8.4E-03 | 1.8E-03 | -3.2E-04 | 4.1E-05 | -3.0E-06 |
| S16 | 8.4E-01 | 7.7E-03 | 2.0E-04 | 1.1E-04 | -1.4E-05 | -6.8E-07 |

Fig. 6B

| lens | surface | curvature radius (mm) | thickness (mm) | refractive index | material | Abbe number |
|---|---|---|---|---|---|---|
| L1' | S1' | 22.87 | 1.50 | 1.6 | plastic | 30 |
| | S2' | 14.17 | 5.32 | | | |
| L2 | S3 | 9.03 | 0.60 | 1.8 | glass | 45 |
| | S4 | 3.61 | 1.98 | | | |
| L3 | S5 | 57.04 | 0.45 | 1.7 | glass | 53 |
| | S6 | 2.11 | 2.47 | | | |
| L4 | S7 | 6.40 | 1.39 | 1.8 | glass | 23 |
| | S8 | -79.80 | 0.72 | | | |
| St | St | ∞ | 0.20 | | | |
| L5 | S9 | -7.05 | 0.88 | 1.9 | glass | 35 |
| | S10 | -4.09 | 0.10 | | | |
| L6 | S11 | 3.47 | 1.43 | 1.5 | glass | 80 |
| | S12 | -4.64 | 0 | | | |
| L7 | S13 | -4.64 | 0.40 | 1.9 | glass | 20 |
| | S14 | 6.82 | 0.57 | | | |
| L8 | S15 | 3.03 | 1.83 | 1.6 | glass | 60 |
| | S16 | -4.68 | 1.48 | | | |
| F | S17 | ∞ | 0.30 | | glass | 60 |
| | S18 | ∞ | 0.45 | | | |
| C | S19 | ∞ | 0.54 | | glass | 60 |
| | S20 | ∞ | 0.44 | | | |
| | I | ∞ | 0 | | | |

Fig. 8

|  | optical lens OL1 | optical lens OL2 | optical lens OL3 | optical lens OL4 |
|---|---|---|---|---|
| F1 | 52.3 | - | 36.1 | - |
| F1' | - | 39.6 | - | 33.3 |
| R1 | 11.7 | - | 12.5 | - |
| R2 | 8.1 | - | 7.1 | - |
| R1' | - | 393.6 | - | 22.9 |
| R2' | - | 22.8 | - | 14.2 |
| \|F1'/F1\| | 0.76 | | 0.92 | |
| R2'/R1' | 0.06 | | 0.62 | |
| R2/R1 | 0.69 | | 0.56 | |
| R1/R1' | 0.03 | | 0.55 | |
| R2/R2' | 0.36 | | 0.5 | |

Fig. 9

OPTICAL LENS AND ELECTRONIC DEVICE USING THE SAME

CROSS-REFERENCE TO RELATED APPLICATION

This application claims priority to Taiwan Application Serial Number 106121110, filed Jun. 23, 2017, which is herein incorporated by reference.

BACKGROUND

Field of Invention

The present invention relates to an optical lens and electronic device using the same. In particular, the optical lens and electronic device have broader field of view and are capable of capturing images in a different medium.

Description of Related Art

Recently, with an upsurge of sports photography, small size optical lenses are required, and thus invoking development of image capturing devices to achieve high image quality and small occupied volume. These image capturing devices are mainly applied to real-time outdoor photography, and the lens of the image capturing device requires properties such as short total track length (TTL) and wide field of view (FOV).

General image capture devices used in a normal environment lack flexibility for photographing parameters adjustment. For example, when refractive indexes of the ambient medium change, the FOV and modulation transfer function (MTF) of the image capture device are weakened, and further result in a reduction of image quality. The aforementioned problem is insurmountable for known devices, and thus making the image capture devices extremely difficult to achieve a stable image quality and an ultra-wide FOV. As above, there is an imperative to provide a new optical lens and electronic device, which is capable to achieve a good MTF as the environment change, and maintain or enlarge the FOV at the same time.

SUMMARY

One aspect of the present invention provides an optical lens. The optical lens from an object side to an image-forming side includes a first lens, a second lens, a third lens, a fourth lens, a fifth lens, a sixth lens, a seventh lens, and an eighth lens. The second lens and the third lens have negative refractive powers. The fourth lens, the sixth lens, and the eighth lens have positive refractive powers. An object-side surface of the first lens is a convex surface, and/or an image-side surface of the first lens is a concave surface.

Another aspect of the present invention provides an optical lens. The optical lens from an object side to an image-forming side includes a first lens, a second lens, a third lens, a fourth lens, a fifth lens, a sixth lens, a seventh lens, and an eighth lens. The second lens and the third lens have negative refractive powers. The fourth lens, the sixth lens, and the eighth lens have positive refractive powers. An equivalent refractive power of the first lens, the second lens, the third lens, and the fourth lens is a negative refractive power. An equivalent refractive power of the fifth lens, the sixth lens, the seventh lens, and the eighth lens is a positive refractive power.

Yet another aspect of the present invention provides an optical lens. The optical lens from an object side to an image-forming side includes a first lens, a second lens, a third lens, a fourth lens, a fifth lens, a sixth lens, a seventh lens, and an eighth lens. The second lens and the third lens have negative refractive powers. The fourth lens, the sixth lens, and the eighth lens have positive refractive powers. The first lens is a plastic lens, and/or the sixth lens and the seventh lens are made into a doublet lens.

Still another aspect of the present invention provides an optical lens. The optical lens from an object side to an image-forming side includes a first lens, a second lens, a third lens, a fourth lens, a fifth lens, a sixth lens, a seventh lens, and an eighth lens. The first lens, the second lens, the third lens, and the seventh lens have negative refractive powers. The fourth lens, the fifth lens, the sixth lens, and the eighth lens have positive refractive powers.

The last aspect of the present invention provides an electronic device, which includes two sets of the optical lenses mentioned above.

It is to be understood that both the foregoing general description and the following detailed description are by example, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 2A lists parameters of each lens of the optical lens in FIG. 1 according to an embodiment of the present invention;

FIG. 2B lists aspherical coefficients of the aspherical surface formula of the lenses in optical lens shown in FIG. 1 and FIG. 2A according to an embodiment of the present invention;

FIG. 4A lists parameters of each lens of the optical lens in FIG. 3 according to an embodiment of the present invention;

FIG. 4B lists aspherical coefficients of the aspherical surface formula of the lenses in optical lens shown in FIG. 3 and FIG. 4A according to an embodiment of the present invention;

FIG. 6A lists parameters of each lens of the optical lens in FIG. 5 according to an embodiment of the present invention;

FIG. 6B lists aspherical coefficients of the aspherical surface formula of the lenses in optical lens shown in FIG. 5 and FIG. 6A according to an embodiment of the present invention;

FIG. 8 lists parameters of each lens of the optical lens in FIG. 7 according to an embodiment of the present invention; and FIG. 9 lists optical properties of the optical lenses shown in FIGS. 2A, 4A, 6A, and FIG. 8.

DETAILED DESCRIPTION

Figure 1:
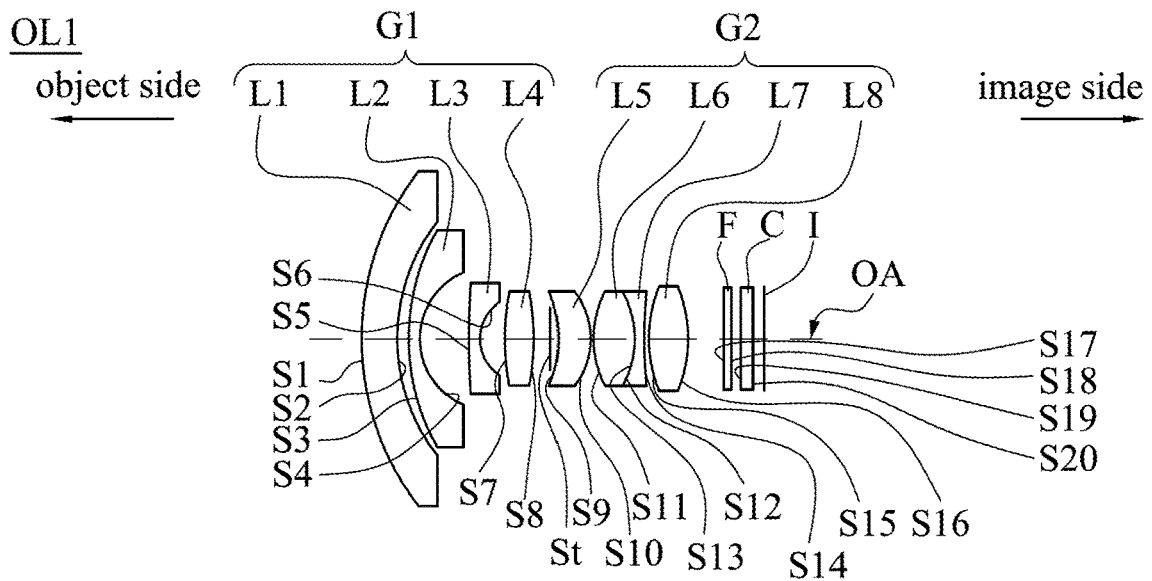
FIG. 1 illustrates an optical lens according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 illustrates an optical lens OL1 according to an embodiment of the present invention. For lucidity, only structures related to the present embodiment are illustrated, and the rest are omitted. The optical lens OL1 may be a fixed focus lens or a zoom lens applicable to electronic devices capable of projecting or capturing image. The electronic device includes but is not limited to a (portable) communication device, airborne device, sport camera device, vehicle camera device, monitoring device, camera/video device, or image projection device.

In one embodiment, the optical lens OL1 from an object side to an image-forming side includes a first lens group G1 and a second lens group G2, in which the first lens group G1 has a negative refractive power, and the first lens group G1 includes a plurality of lenses; the second lens group G2 has a refractive power, which may be a negative refractive power or a positive refractive power for example, and the second lens group G2 includes a plurality of lenses. Each of the lenses may be arranged along an optical axis OA of the optical lens OL1.

As shown in FIG. 1, the first lens group G1 may include at least four lenses; the second lens group G2 may include at least four lenses. In one practical embodiment, some of the four lenses of the second lens group G2 may be made into a doublet lens (not labelled), in which the doublet lens may be made of two or more than two lenses, but the invention is not limited thereto.

In one embodiment, the first lens group G1 may include four lenses, in which at least two lenses have negative refractive powers, at least one lens has a positive refractive power, and the other has a refractive power, which may be a negative refractive power or a positive refractive power for example; in another embodiment, the second lens group G2 may include four lenses, in which at least two lenses have positive refractive powers, and the others have refractive powers, which may be a positive refractive power and/or a negative refractive power respectively, for example.

Please refer to FIG. 1, the first lens group G1 from the object side to the image-forming side includes a first lens L1, a second lens L2, a third lens L3, and a fourth lens L4; the second lens group G2 from the object side to the image-forming side includes a fifth lens L5, a sixth lens L6, a seventh lens L7, and an eighth lens L8. In one embodiment, an equivalent refractive power of the first lens L1, the second lens L2, the third lens L3, and the fourth lens L4 is a negative refractive power, and an equivalent refractive power of the fifth lens L5 the sixth lens L6, the seventh lens L7, and the eighth lens L8 is a positive refractive power.

In one embodiment, the second lens L2 and the third lens L3 may have a negative refractive power; the fourth lens L4, the sixth lens L6, and the eighth lens L8 may have a positive refractive power; and the first lens L1, the fifth lens L5, and the seventh lens L7 may respectively have a positive refractive power or a negative refractive power. In one practical embodiment, the first lens L1 has a negative refractive power, the fifth lens L5 has a positive refractive power, and the seventh lens L7 has a negative refractive power, but the invention is not limited thereto.

In addition, in one embodiment, an equivalent refractive power of the sixth lens L6 and the seventh lens L7 is a negative refractive power, which means a combination of the sixth lens L6 and the seventh lens L7 is equivalent to a lens having a negative refractive power. In particular, as shown in FIG. 1, the sixth lens L6 and the seventh lens L7 may be made into a doublet lens having a refractive power, and an image-side surface S12 of the sixth lens L6 matches with an object-side surface S13 of the seventh lens L7 (which means the image-side surface S12 of the sixth lens and the object-side surface S13 of the seventh lens are substantially identical). In other words, if the image-side surface S12 protrudes towards the image-forming side, then the object-side surface S13 recesses towards the object side; and if the image-side surface S12 recesses towards the object side, then the object-side surface S13 protrudes towards the object side. In addition, in another embodiment, the doublet lens may have a negative refractive power.

As shown in FIG. 1, the first lens L1 is the lens closest to the object side within the first lens group G1, the fourth lens L4 is the lens closest to the image-forming side within the first lens group G1, the fifth lens L5 is the lens closest to the object side within second lens group G2, and the eighth lens L8 is the lens closest to the image-forming side within second lens group G2, but the invention is not limited thereto. In another embodiment, any or at least one interval between the first lens L1 to the eighth lens L8 may further include one or more lenses (not shown) with refractive powers; or at the object side of the first lens L1 may further include one or more lenses (not shown) with refractive powers; or an interval between the eighth lens L8 and the image plane I may further include one or more lenses (not shown) with refractive powers.

The optical lens OL1 has a field of view (FOV). In one embodiment, the optical lens OL1 may satisfy at least one of the following conditions: $200°≤FOV$, $190°≤FOV$, $185°≤FOV$, $175°≤FOV$, $170°≤FOV$, $180°≤FOV$, $FOV≤210°$, $FOV≤220°$, and $FOV≤230°$.

In another embodiment, the first lens L1 of the optical lens OL1 may satisfy at least one of the following conditions: $0<|Rr|$, $0.05≤|Rr|$, $|Rr|≤0.7$, $|Rr|≤0.75$, $|Rr|≤0.8$, $|Rr|0.85$, in which Rr=(a curvature radius of the image-side surface S2 of the first lens L1)/(a curvature radius of the object-side surface S1 of the first lens L1).

In yet another embodiment, an optical effective diameter of the first lens L1 is larger than or equal to an optical effective diameter of any one of the following lens: the second lens L2, the third lens L3, the fourth lens L4, the fifth lens L5, the sixth lens L6, the seventh lens L7, and the eighth lens L8.

In addition, the first lens L1, the second lens L2, the third lens L3, the fourth lens L4, the fifth lens L5, the sixth lens L6, the seventh lens L7, and the eighth lens L8 may respectively be implemented as a plastic lens or a glass lens. The glass lens may be made of a glass material, and the plastic lens may be made of a plastic material, in which the plastic material may include but not limit to polycarbonate, cycloolefin copolymer (APEL for example), polyester resin (OKP4 or OKP4HT for example) and else, or may include a mixture material and/or a compound material including at least one of the aforementioned materials.

In one embodiment, the first lens L1 is implemented as a plastic lens or a glass lens, the second lens L2, the third lens L3, the fourth lens L4, the fifth lens L5, the sixth lens L6, the seventh lens L7, and the eighth lens L8 may all be implemented as glass lenses, or at least one of which is implemented as a glass lens; in yet another embodiment, the first lens L1 is implemented as a plastic lens, the eighth lens L8 is implemented as a glass lens, and any one of the second lens L2, third lens L3, the fourth lens L4, the fifth lens L5, the sixth lens L6, and the seventh lens L7 may be implemented as a plastic lens or a glass lens.

In one embodiment, the first lens L1, the second lens L2, the third lens L3, the fourth lens L4, the fifth lens L5, the sixth lens L6, the seventh lens L7, and the eighth lens L8 may respectively be a spherical lens, a free-form lens, or an aspherical lens. For example, the second lens L2, the third lens L3, the fourth lens L4, the fifth lens L5, the sixth lens L6, and the seventh lens L7 are spherical lens, and the first lens L1 and the eighth lens L8 are an aspherical lens or a free-form lens respectively; or, the first lens L1, the second lens L2, the third lens L3, the fourth lens L4, the fifth lens L5, the sixth lens L6, and the seventh lens L7 are spherical lenses, and the eighth lens L8 is an aspherical lens or a free-form lens.

In particular, every free-form lens has at least one free-form surface, which means an object-side surface or/and an image-side surface of the free-form lens is a free-form surface; and every aspherical lens has at least one aspherical surface, which means an object-side surface or/and an image-side surface of the aspherical lens is an aspherical surface. In addition, every aspherical surface satisfies the following formula:

$$Z = \left[\frac{(C*Y^2)}{1+\sqrt{1-(K+1)C^2Y^2}}\right] + \Sigma(A_i * Y^i)$$

where Z is a coordinate value on the optical axis OA, positive value denotes for light propagating direction; Ai is an aspherical constant, in which i=4, 6, 8, 10, or 12; K is a quadratic surface coefficient; C is a reciprocal of curvature radius r (C=1/r); Y is a coordinate value in a direction orthogonal to the optical axis OA. Furthermore, every parameter or coefficient of the aspherical surface formula may be independent from each other.

As shown in FIG. 1, object-side surfaces S1, S2, S5 and image-side surfaces S2, S4, S6 of the first lens L1, the second lens L2, and the third lens L3 of the optical lens OL1 may all have positive refractive powers. The object-side surfaces S1, S3, S5 may be convex surfaces protruding towards the object side respectively; and the image-side surfaces S2, S4, S6 may be concave surfaces recessing towards the object side respectively. For example, the first lens L1, the second lens L2, and the third lens L3 may be implemented as lenses with refractive powers, in which the lenses may be convex-concave glass lenses or convex-concave plastic lenses with negative refractive power. The object-side surfaces S1, S3, S5 and the image-side surfaces S2, S4, S6 may all be spherical surfaces, or at least one of which is an aspherical surface or a free-form surface. In one embodiment, the image-side surface S2 of the first lens L1 of the optical lens OL1 may be an aspherical surface or a free-form surface.

Object-side surfaces S7, S11, S15 of the fourth lens L4, the sixth lens L6, and the eighth lens L8 may have positive refractive powers respectively, in which the object-side surfaces S7, S11, S15 may be convex surfaces protruding towards the object side; and image-side surfaces S8, S12, S16 may have negative refractive powers respectively, in which the image-side surfaces S8, S12, S16 may be convex surfaces protruding towards the image-forming side. For example, the fourth lens L4, the sixth lens L6, and the eighth lens L8 may be implemented as a biconvex glass lens or a biconvex plastic lens respectively. The object-side surfaces S7, S11, S15 and the image-side surfaces S8, S12, S16 may all be spherical surfaces, or at least one of which is an aspherical surface or a free-form surface. In one embodiment, the object-side surface S15 and the image-side surface S16 of the eighth lens L8 may be an aspherical surface or a free-form surface respectively.

An object-side surface S9 and an image-side surface S10 of the fifth lens L5 may have negative refractive powers. The object-side surface S9 may be a concave surface recessing towards the image-forming side. For example, the fifth lens L5 may be implemented as a concave-convex glass lens or a concave-convex plastic lens having a positive refractive power or a negative refractive power. In one embodiment, the fifth lens L5 is implemented as a concave-convex glass spherical lens having a positive refractive power.

An object-side surface S13 of the seventh lens L7 may have a negative refractive power, in which the object-side surface S13 may be a concave surface recessing towards the image-forming side; an image-side surface S14 may have a positive refractive power, in which the image-side surface S14 may be a concave surface recessing towards the object side. For example, the seventh lens L7 may be implemented as a biconcave glass spherical lens or a biconcave plastic spherical lens having a negative refractive power.

In addition, the optical lens OL1 may further include an aperture stop St and/or a protection cover C; the image plane I may be further disposed with an image capture unit (not shown), in which light passing through the optical lens OL1 may be converted into electric signals by the image capture unit. The aperture stop St may be disposed between any two lenses of the first lens L1 to eighth lens L8 in the optical lens OL1, at object side of the first lens L1, or between the eighth lens L8 and the image plane I. In one embodiment, the aperture stop St is disposed between the first lens group G1 and the second lens group G2, but the invention is not limited thereto; in addition, the protection cover C may be disposed between the eighth lens L8 and the image plane I.

In other aspect, the optical lens OL1 may further include a filter F, which may be disposed between the eighth lens L8 and the protection cover C. In addition, in another embodiment, the protection cover C may protect the image capture unit and filter out infrared light at the same time, and thus the filter F may be omitted.

FIG. 2A lists parameters of each lens of the optical lens OL1 in FIG. 1 according to an embodiment of the present invention, in which FIG. 2A includes radius curvature, thickness, refractive power, material, Abbe number (dispersion coefficient), and so on. The reference number of surfaces of the lenses are arranged from the object side to the image-forming side in order, for example, "St" denotes the aperture stop St, "S1" denotes the object-side surface S1 of the first lens L1, "S2" denotes the image-side surface S2 of the first lens L1 . . . "S17" and "S18" denote an object-side surface and an image-side surface of the filter F respectively, "S19" and "S20" denote an object-side surface and an image-side surface of the protection cover C respectively, and so on. In addition, the thickness denotes a distance from a surface to a surface next to it at the image-forming side. For example, the "thickness" of the image-side surface S2 denotes the distance from the image-side surface S2 of the first lens L1 to the object-side surface S3 of the second lens L2.

FIG. 2B lists aspherical coefficients of the aspherical surface formula of the lenses in optical lens OL1 shown in FIG. 1 and FIG. 2A according to an embodiment of the present invention. In the present embodiment, the image-side surface S2 of the first lens L1 of the optical lens OL1, the object-side surface S15 and the image-side surface S16 of the eighth lens L8 are aspherical surfaces, and coefficients of the aspherical surface formula are shown in FIG. 2B.

Figure 3:
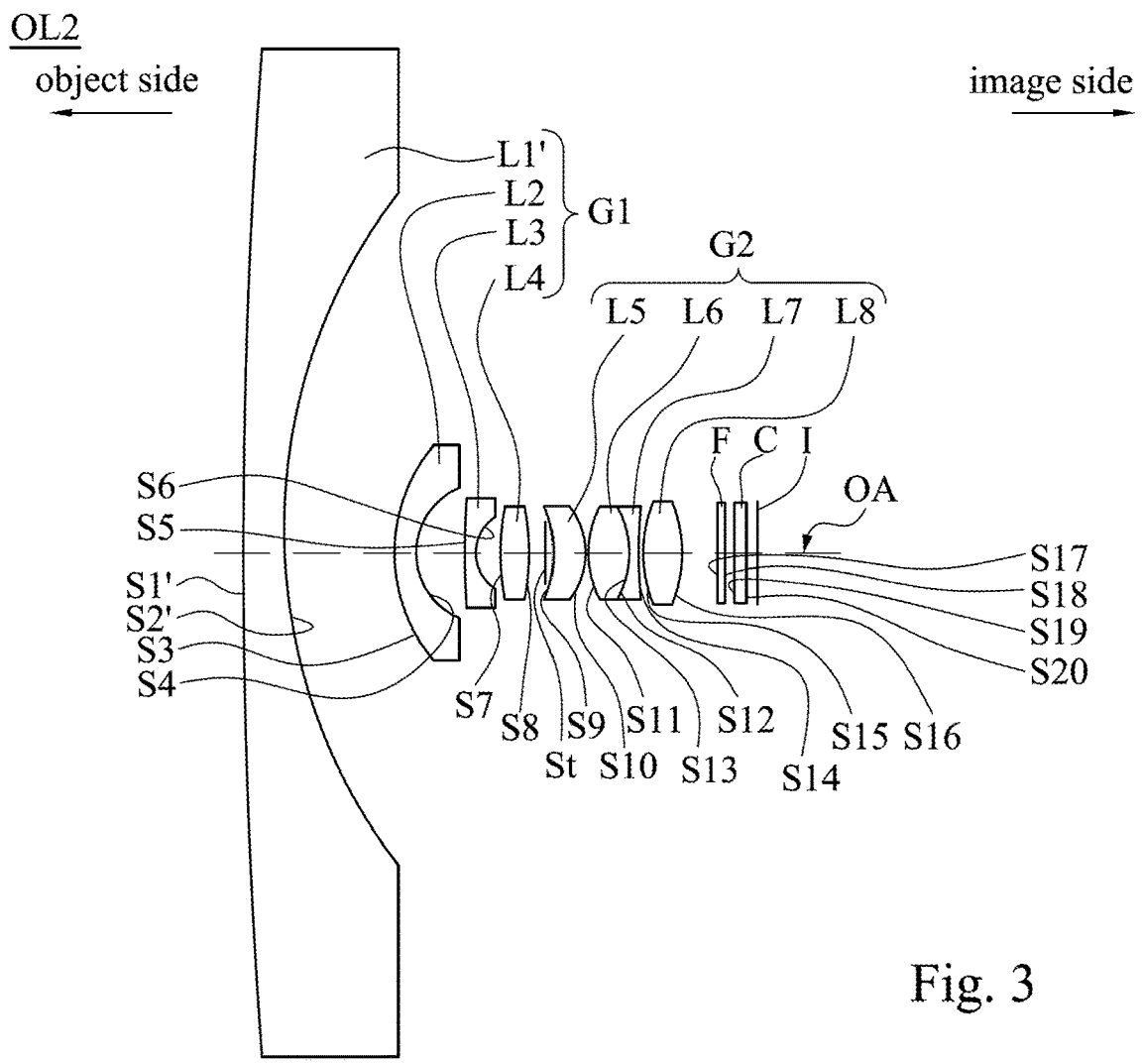
FIG. 3 illustrates an optical lens according to another embodiment of the present invention.

FIG. 3 illustrates an optical lens OL2 according to another embodiment of the present invention; FIG. 4A lists parameters of each lens of the optical lens OL2 in FIG. 3 according to an embodiment of the present invention; and FIG. 4B lists aspherical coefficients of the aspherical surface formula of the lenses in optical lens OL2 shown in FIG. 3 and FIG. 4A according to an embodiment of the present invention. The optical lens OL2 of the present embodiment is similar to the optical lens OL1, and thus reference names and number are generally the same, in which an image-side surface S2' of a first lens L1' of the optical lens OL2 is an aspherical surface; and the optical lens OL2 may be installed with the eighth lens L8 of the optical lens OL1.

The difference between the optical lens OL2 and the optical lens OL1 lies in that the first lens L1 of the optical lens OL1 is different from the first lens L1' of the optical lens OL2. At least one physical property of the first lens L1 of the optical lens OL1 is different from that of the first lens L1' of the optical lens OL2, such as the refractive power of the object-side surface S1, the refractive power of the image-side surface S2, the thickness, the refractive power, Abbe number, and so on, and thus the optical lens OL1 and optical lens OL2 exhibit different optical performance and functionality.

Figure 5:
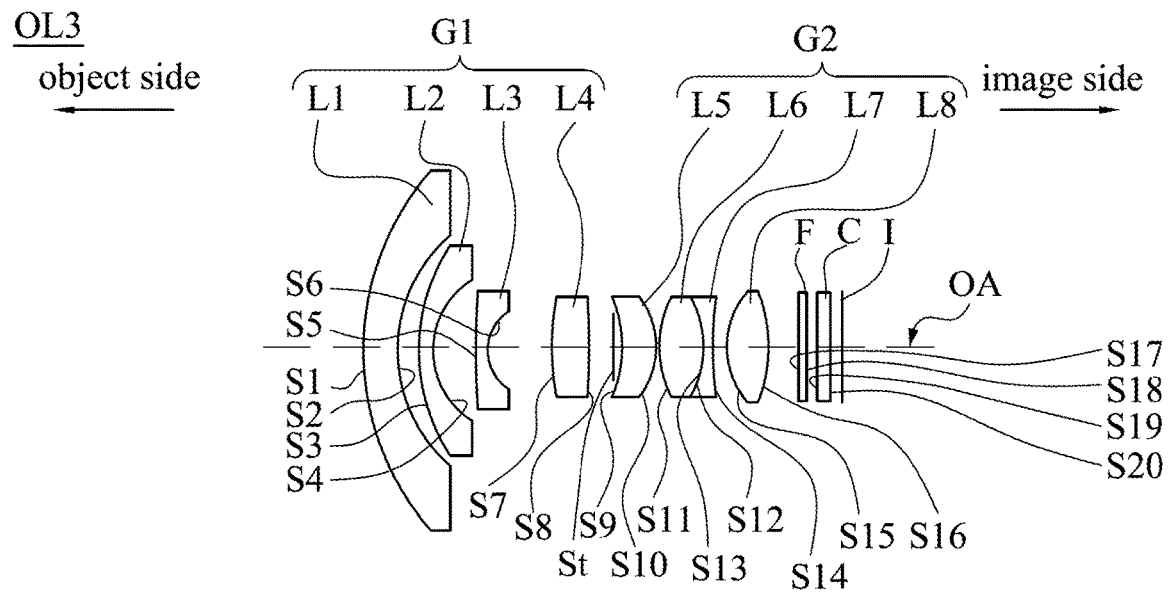
FIG. 5 illustrates an optical lens according to another embodiment of the present invention.

FIG. 5 illustrates an optical lens OL3 according to another embodiment of the present invention; FIG. 6A lists parameters of each lens of the optical lens OL3 in FIG. 5 according to an embodiment of the present invention; and FIG. 6B lists aspherical coefficients of the aspherical surface formula of the lenses in optical lens OL3 shown in FIG. 5 and FIG. 6A according to an embodiment of the present invention. The optical lens OL3 of the present embodiment is similar to the optical lens OL1, and thus reference names and number are generally the same. In the present embodiment, the object-side surface S15 and the image-side surface S16 of the eighth lens L8 are aspherical surfaces, and the aspherical coefficients of the aspherical surface formula are shown in FIG. 6B.

Figure 7:
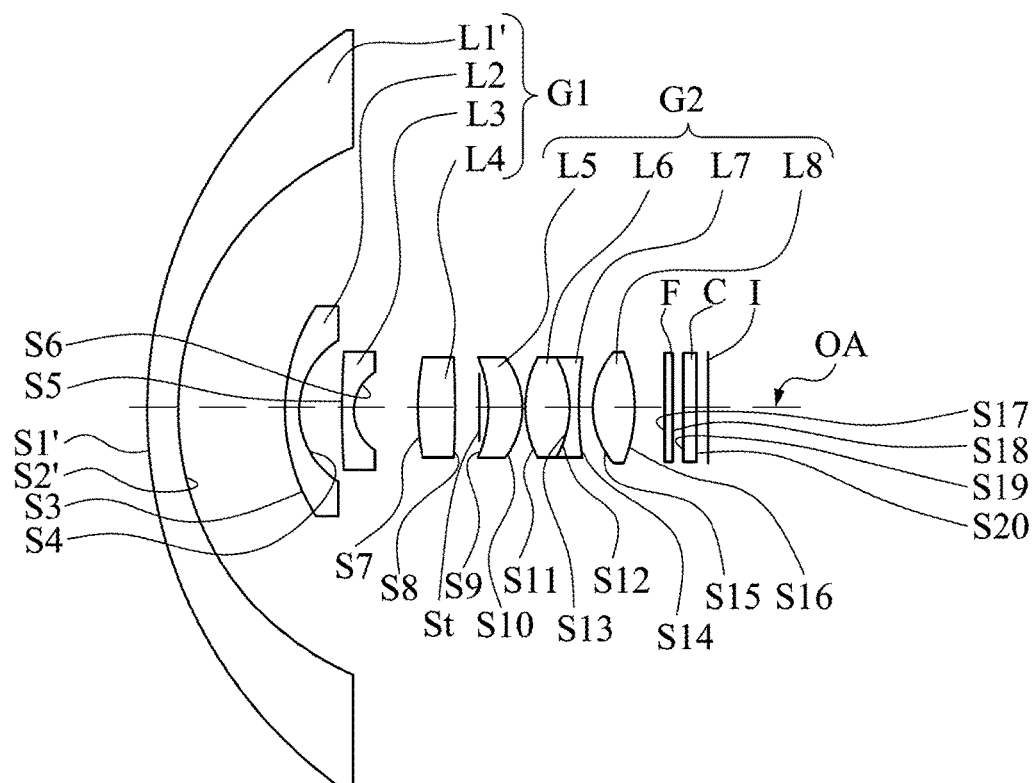
FIG. 7 illustrates an optical lens according to another embodiment of the present invention.

FIG. 7 illustrates an optical lens OL4 according to another embodiment of the present invention; FIG. 8 lists parameters of each lens of the optical lens OL4 in FIG. 7 according to an embodiment of the present invention. The optical lens OL4 of the present embodiment is similar to the optical lens OL3, and thus reference names and number are generally the same.

Furthermore, please refer to FIG. 5 to FIG. 8, a main difference between the optical lens OL4 and the optical lens OL3 lies in that the first lens L1 of the optical lens OL3 is replaced by a first lens L1' of the optical lens OL4, by such further ensuring high image quality when using the optical lens OL4 capturing image in different ambient medium. At least one physical property of the first lens L1' of the optical lens OL4 is different from that of the first lens L1 of the optical lens OL3, such as the refractive power of the object-side surface S1, the refractive power of the image-side surface S2, the thickness, the refractive power, Abbe number, and so on, and thus the optical lens OL1 and optical lens OL2 have different optical performance and/or functionality.

FIG. 9 lists optical properties of the optical lenses OL1, OL2, OL3, and OL4 shown in FIGS. 2A, 4A, 6A, and FIG. 8.

In addition, with reference made to FIG. 1 to FIG. 9, a main difference between the optical lenses OL1, OL2 and optical lenses OL2, OL4 lies in that different first lenses L1, L1' are implemented. As a result, an electronic device (not shown) including the optical lens OL1, OL2 or OL3, OL4 is provided by the present invention. The first lens L1, L1' may be removed from or installed in the electronic device, and thus the optical lens OL1/OL3 and optical lens OL2/OL4 may be switched on the electronic device. In other words, by the removing and installation the first lens L1 and L1, the electronic device may capture image under optimized condition by selectively switching between the optical lens OL1/OL3 and optical lens OL2/OL4.

Further, the electronic device may include plural optical lenses. In one embodiment, the electronic device includes at least two sets of optical lenses OL1, at least two sets of optical lenses OL2, at least two sets of optical lenses OL3, or at least two sets of optical lenses OL4; in another embodiment, the electronic device includes at least one set of optical lens OL1 and at least one of the optical lens OL2, OL3, and OL4, or the electronic device at least includes one set of optical lens OL2 and optical lens OL3 or OL4.

Furthermore, in one embodiment, the first lens L1 of the optical lenses OL1, OL2 and the first lens L1' of the optical lens OL2, OL4 applied to the electronic device may satisfy at least one of the following conditions: $0.5 \leq |F1'/F1|$, $0.6 \leq |F1'/F1|$, $0.7 \leq |F1'/F1|$, $0.75 \leq |F1'/F1|$, $0.76 \leq |F1'/F1|$, $|F1'/F1| \leq 0.92$, $|F1'/F1| \leq 0.93$, and $|F1'/F1| \leq 0.95$, in which F1 is the focal length of the first lens L1, and F1' is the focal length of the first lens L1'.

In another embodiment, the first lens L1, L1' of the electronic device may satisfy at least one of the following conditions: $0 < |R1/R1'|$, $0.01 \leq |R1/R1'|$, $0.02 \leq |R1/R1'|$, $0.03 \leq |R1/R1'|$, $|R1/R1'| \leq 0.55$, $|R1/R1'| \leq 0.6$, and $|R1/R1'| \leq 0.7$, in which the curvature radius of the object-side surface S1 of the first lens L1 is R1, and the curvature radius of the object-side surface S1' of the first lens L1' is R1'.

In yet another embodiment, the first lenses L1, L1' may satisfy at least one of the following conditions: $0 < |R2/R2'|$, $0.3 \leq |R2/R2'|$, $0.35 \leq |R2/R2'|$, $0.36 \leq |R2/R2'|$, $|R2/R2'| \leq 0.5$, $|R2/R2'| \leq 0.55$, $|R2/R2'| \leq 0.65$, $|R2/R2'| \leq 0.7$, and $|R2/R2'| \leq 0.75$, in which the radius curvature of the image-side surface S2 of the first lens L1 is R2, and the radius curvature of the image-side surface S2' of the first lens L1' is R2'.

In one embodiment, the first lens L1 of the optical lens OL1, OL3 may satisfy at least one of the following conditions: $0 < |R2/R1|$, $0.05 \leq |R2/R1|$, $0.4 \leq |R2/R1|$, $0.5 \leq |R2/R1|$, $0.55 \leq |R2/R1|$, $0.56 \leq |R2/R1|$, $|R2/R1| \leq 0.69$, $|R2/R1| \leq 0.7$, $|R2/R1| \leq 0.75$, $|R2/R1| \leq 0.8$, and $|R2/R1| \leq 0.85$.

In one embodiment, the first lens L1' of the optical lens OL2, OL4 may satisfy at least one of the following conditions: $0 < |R2'/R1'|$, $0.02 \leq |R2'/R1'|$, $0.05 \leq |R2'/R1'|$, $0.06 \leq |R2'/R1'|$, $|R2'/R1'| \leq 0.62$, $|R2'/R1'| \leq 0.65$, $|R2'/R1'| \leq 0.7$, $|R2+/R1'| \leq 0.75$, $|R2'/R1'| \leq 0.8$, and $|R2'/R1'| \leq 0.85$.

As above, the optical lens OL1, OL3 may provide a better image quality in one medium environment, and the optical lens OL2 may provide a better image quality in another medium environment. The medium environment includes but is not limited to air, ocean, swimming pool, and so on, and the present invention is not limited thereto.

As embodiments mentioned above, it should be understood that in different medium environments, by switching between the first lens L1 and L1', the optical lenses OL1, OL2, OL3, OL4 may provide wide field of view and clear image quality at the same time.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical lens, from an object side to an image-forming side, comprising:
    a first lens, a second lens, a third lens, a fourth lens, a fifth lens, a sixth lens, a seventh lens, and an eighth lens, wherein
    the second lens and the third lens have negative refractive powers;
    the fourth lens, the sixth lens and the eighth lens have positive refractive powers; and
    the sixth lens and the seventh lens are made into a doublet lens, and an equivalent refractive power of the sixth lens and the seventh lens is a negative refractive power.

2. The optical lens according to claim 1, wherein Rr=(a curvature radius of the image-side surface of the first lens)/(a curvature radius of the object-side surface of the first lens), and 0<|Rr| and/or |Rr|≤0.85.

3. The optical lens according to claim 1, wherein an effective diameter of the first lens is larger than or equal to an effective diameter of the second lens, an effective diameter of the third lens, an effective diameter of the fourth lens, an effective diameter of the fifth lens, an effective diameter of the sixth lens, an effective diameter of the seventh lens, and an effective diameter of the eighth lens.

4. The optical lens according to claim 1, wherein the optical lens satisfies at least one of the following conditions:
    the first lens has a negative refractive power, and/or the first lens is an aspherical lens;
    the fifth lens has a positive refractive power;
    the seventh lens has a negative refractive power;
    the eighth lens is an aspherical lens;
    at least one of the second lens, the third lens, the fourth lens, the fifth lens, the sixth lens, the seventh lens and the eighth lens is a glass lens;
    the optical lens has a field of view FOV, and 170°≤FOV and/or FOV≤230°;
    an object-side surface equivalent of the first lens is a convex surface;
    an image-side surface of the first lens is a concave surface; and
    the first lens is a plastic lens.

5. The optical lens according to claim 1, wherein the first lens is a convex-concave lens, the second lens is a convex-concave lens, the third lens is a convex-concave lens, the fourth lens is a biconvex lens, the fifth lens is a concave-convex lens, the sixth lens is a biconvex lens, the seventh lens is a biconcave lens, or the eighth lens is a biconvex lens.

6. An electronic device, comprising two sets of the optical lenses according to claim 1, wherein each set of the optical lens comprises the first lens, the second lens, the third lens, the fourth lens, the fifth lens, the sixth lens, the seventh lens and the eighth lens.

7. The electronic device of claim 6, wherein the two set of optical lenses are two first optical lenses or two second optical lenses, and each the first optical lens and each the second optical lens satisfy at least one of the following conditions: 0.5≤|F1'/F1|, |F1'/F1|≤0.95, 0<|R1/R1'|, |R1/R1'|≤0.7, 0<|R2/R2'|, and |R2/R2'|≤0.75, wherein F1 and F1' are focal lengths of the first lenses of the first optical lenses and the second optical lenses respectively;
R1 and R1' are curvature radii of the object-side surfaces of the first lenses of the first optical lenses and the second optical lenses respectively; and
R2 and R2' are curvature radii of the image-side surfaces of the first lenses of the first optical lenses and the second optical lenses respectively.

8. An optical lens, from an object side to an image-forming side, comprising:
    a first lens, a second lens, a third lens, a fourth lens, a fifth lens, a sixth lens, a seventh lens, and an eighth lens, wherein
    the second lens and the third lens have negative refractive powers; the fourth lens, the sixth lens, and the eighth lens have positive refractive powers;
    an equivalent refractive power of the first lens, the second lens, the third lens, and the fourth lens in total is a negative refractive power; and
    an equivalent refractive power of the fifth lens, the sixth lens, the seventh lens, and the eighth lens in total is a positive refractive power.

9. The optical lens according to claim 8, wherein Rr=(a curvature radius of an image-side surface of the first lens)/(a curvature radius of an object-side surface of the first lens), and 0<|Rr| and/or |Rr|≤0.85.

10. The optical lens according to claim 8, wherein an effective diameter of the first lens is larger than or equal to an effective diameter of the second lens, an effective diameter of the third lens, an effective diameter of the fourth lens, an effective diameter of the fifth lens, an effective diameter of the sixth lens, an effective diameter of the seventh lens, and an effective diameter of the eighth lens.

11. The optical lens according to claim 8, wherein the optical lens satisfies at least one of the following conditions:
    the first lens has a negative refractive power, and/or the first lens is an aspherical lens;
    the fifth lens has a positive refractive power;
    the seventh lens has a negative refractive power;
    an equivalent refractive power of the sixth lens and the seventh lens is a negative refractive power;
    the eighth lens is an aspherical lens;
    at least one of the second lens, the third lens, the fourth lens, the fifth lens, the sixth lens, the seventh lens, and the eighth lens is a glass lens; and
    the optical lens has a field of view FOV, and 170°≤FOV and/or FOV≤230°.

12. The optical lens according to claim 8, wherein the first lens is a convex-concave lens, the second lens is a convex-concave lens, the third lens is a convex-concave lens, the fourth lens is a biconvex lens, the fifth lens is a concave-convex lens, the sixth lens is a biconvex lens, the seventh lens is a biconcave lens, or the eighth lens is a biconvex lens.

13. An electronic device, comprising two sets of the optical lenses according to claim 8, wherein each set of the optical lens comprises the first lens, the second lens, the third lens, the fourth lens, the fifth lens, the sixth lens, the seventh lens and the eighth lens.

14. The electronic device of claim 13, wherein the two set of optical lenses are two first optical lenses or two second optical lenses, and each the first optical lens and each the second optical lens satisfy at least one of the following conditions:
    0.5≤|F1'/F1|, |F1'/F1|≤0.95, 0<|R1/R1'|, |R1/R1'|≤0.7, 0<|R2/R2'|, and |R2/R2'|≤0.75, wherein F1 and F1' are focal lengths of the first lenses of the first optical lenses and the second optical lenses respectively;

R1 and R1' are curvature radii of object-side surfaces of the first lenses of the first optical lenses and the second optical lenses respectively; and R2 and R2' are curvature radii of image-side surfaces of the first lenses of the first optical lenses and the second optical lenses respectively.

15. An optical lens, from an object side to an image-forming side, the optical lens consisting of:

a first lens, a second lens, a third lens, a fourth lens, a fifth lens, a sixth lens, a seventh lens, and an eighth lens, wherein the first lens, the second lens, the third lens, and the seventh lens have negative refractive powers; and the fourth lens, the fifth lens, the sixth lens, and the eighth lens have positive refractive powers.

16. The optical lens according to claim 15, wherein Rr=(a curvature radius of an image-side surface of the first lens)/(a curvature radius of an object-side surface of the first lens), and 0<|Rr| and/or |Rr|≤0.85.

17. The optical lens according to claim 15, wherein an effective diameter of the first lens is larger than or equal to an effective diameter of the second lens, an effective diameter of the third lens, an effective diameter of the fourth lens, an effective diameter of the fifth lens, an effective diameter of the sixth lens, an effective diameter of the seventh lens, and an effective diameter of the eighth lens.

18. The optical lens according to claim 15, wherein the first lens is a convex-concave lens, the second lens is a convex-concave lens, the third lens is a convex-concave lens, the fourth lens is a biconvex lens, the fifth lens is a concave-convex lens, the sixth lens is a biconvex lens, the seventh lens is a biconcave lens, or the eighth lens is a biconvex lens.

19. An electronic device, comprising two sets of the optical lenses according to claim 15, wherein each set of the optical lens is consisted of the first lens, the second lens, the third lens, the fourth lens, the fifth lens, the sixth lens, the seventh lens and the eighth lens.

20. The electronic device of claim 19, wherein the two set of optical lenses are two first optical lenses or two second optical lenses, and each the first optical lens and each the second optical lens satisfy at least one of the following conditions:

0.5≤|F1'/F1|, |F1'/F1|≤0.95, 0<|R1/R1'|, |R1/R1'|≤0.7, 0<|R2/R2'|, and |R2/R2'|≤0.75, wherein F1 and F1' are focal lengths of the first lenses of the first optical lenses and the second optical lenses respectively;

R1 and R1' are curvature radii of object-side surfaces of the first lenses of the first optical lenses and the second optical lenses respectively; and R2 and R2' are curvature radii of image-side surfaces of the first lenses of the first optical lenses and the second optical lenses respectively.

* * * * *